US009992778B2

(12) United States Patent
Brunel et al.

(10) Patent No.: US 9,992,778 B2
(45) Date of Patent: Jun. 5, 2018

(54) METHOD, PROCESSING DEVICE AND INFORMATION STORAGE MEANS FOR ALLOCATING RESOURCES FOR A DOWNLINK COMMUNICATION ON A FREQUENCY SELECTIVE CHANNEL

(71) Applicant: MITSUBISHI ELECTRIC CORPORATION, Tokyo (JP)

(72) Inventors: Loic Brunel, Rennes (FR); Nicolas Gresset, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days. days.

(21) Appl. No.: 14/412,367

(22) PCT Filed: May 31, 2013

(86) PCT No.: PCT/JP2013/065760
§ 371 (c)(1),
(2) Date: Dec. 31, 2014

(87) PCT Pub. No.: WO2014/013811
PCT Pub. Date: Jan. 23, 2014

(65) Prior Publication Data
US 2015/0163817 A1 Jun. 11, 2015

(30) Foreign Application Priority Data
Jul. 20, 2012 (EP) .................................. 12177204

(51) Int. Cl.
*H04W 72/08* (2009.01)
*H04L 5/00* (2006.01)
(Continued)

(52) U.S. Cl.
CPC ......... *H04W 72/082* (2013.01); *H04L 5/0042* (2013.01); *H04L 5/0069* (2013.01);
(Continued)

(58) Field of Classification Search
None
See application file for complete search history.

(56) References Cited

U.S. PATENT DOCUMENTS

| 2005/0026608 | A1* | 2/2005 | Kallio | ................ | H04B 7/18563 |
|---|---|---|---|---|---|
| | | | | | 455/431 |
| 2011/0028163 | A1* | 2/2011 | Hoshihara | ............... | H04B 15/04 |
| | | | | | 455/456.1 |
| 2013/0324070 | A1* | 12/2013 | Bennett | .............. | H04B 7/18506 |
| | | | | | 455/404.1 |

FOREIGN PATENT DOCUMENTS

EP 1 959 702 A1 8/2008
EP 2 091 289 A2 8/2009
(Continued)

*Primary Examiner* — Mohammad S Adhami
(74) *Attorney, Agent, or Firm* — Birch, Stewart, Kolasch & Birch, LLP

(57) ABSTRACT

For allocating resources for a downlink communication on a frequency selective channel from an access point of a wireless telecommunications network to a communication device located in a moving conveyance performing a journey on a path, a processing device performs: obtaining a first interference profile according to a position of the moving conveyance on the path, said first interference profile being representative of interference on said downlink communication implied by at least one interferer located along the path; obtaining a second interference profile, said second interference profile being representative of interference on said downlink communication implied by at least one interferer located in the moving conveyance; and allocating the resources for said downlink communication, on the basis of the first and second interference profiles.

16 Claims, 5 Drawing Sheets

Figure 1:
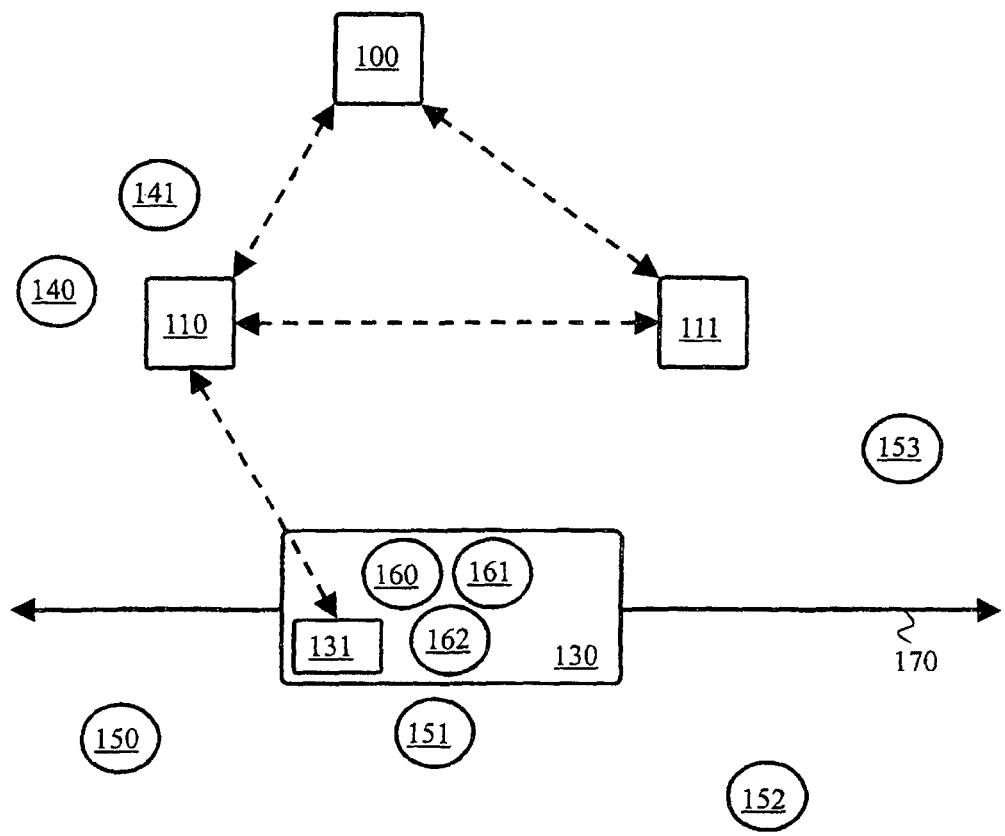

(51) Int. Cl.
  *H04W 24/08*    (2009.01)
  *H04W 72/04*    (2009.01)
  *H04W 84/00*    (2009.01)
  *H04B 17/345*   (2015.01)
  *H04W 28/04*    (2009.01)

(52) U.S. Cl.
  CPC ......... *H04W 24/08* (2013.01); *H04W 72/048* (2013.01); *H04B 17/345* (2015.01); *H04W 28/04* (2013.01); *H04W 84/005* (2013.01)

(56) References Cited

FOREIGN PATENT DOCUMENTS

| | | |
|---|---|---|
| EP | 2 326 116 A1 | 5/2011 |
| EP | 2 091 289 A3 | 8/2011 |
| WO | WO 00/36863 A1 | 6/2000 |
| WO | WO 2009/121010 A2 | 10/2009 |
| WO | WO 2009/121010 A3 | 10/2009 |

* cited by examiner

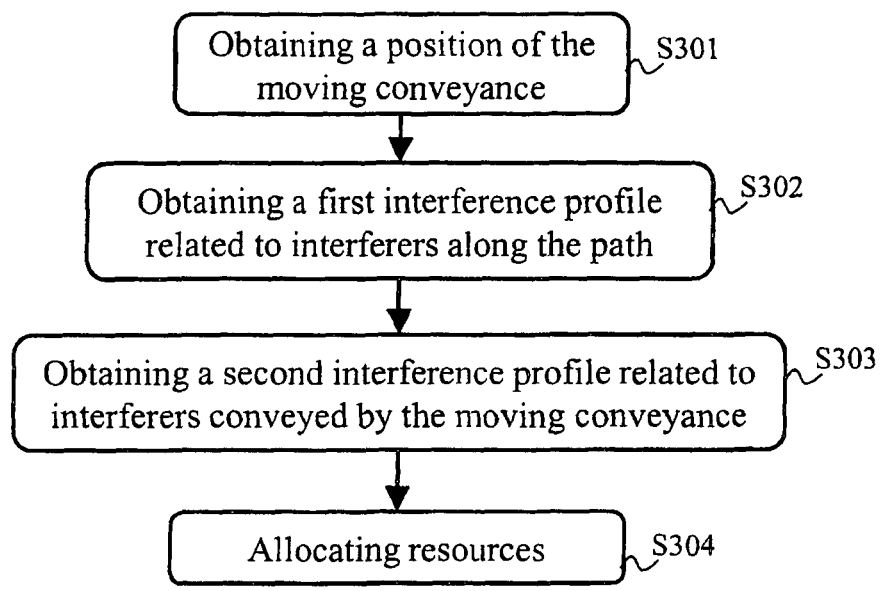
Fig. 3
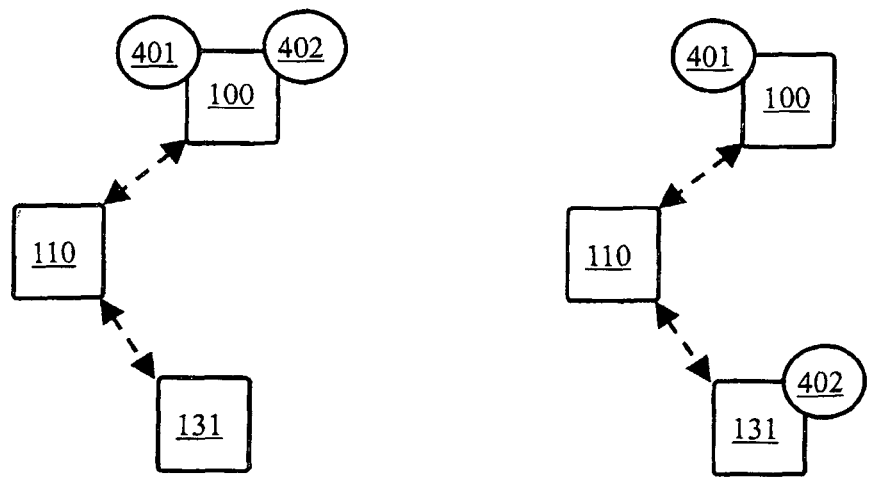
Fig. 4A                    Fig. 4B

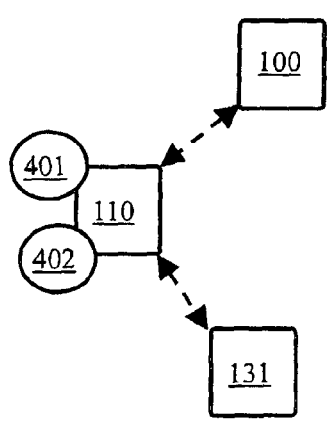
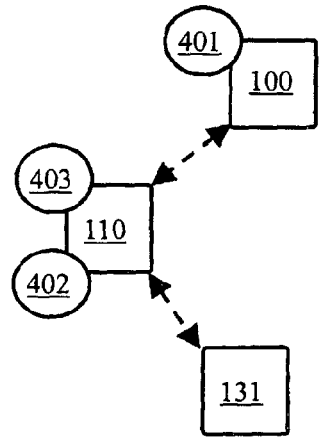
Fig. 4C          Fig. 4D
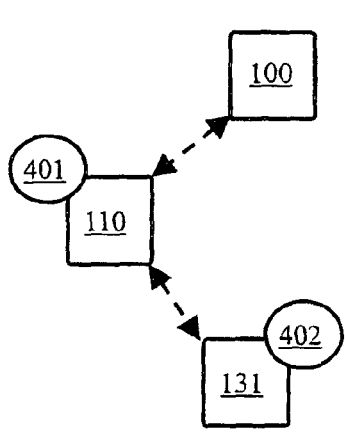
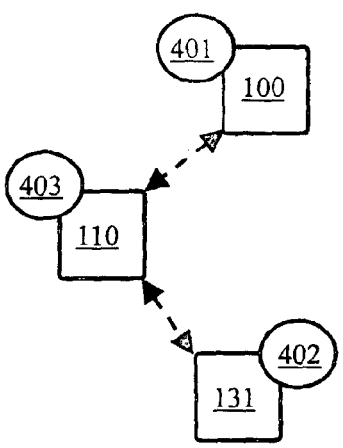
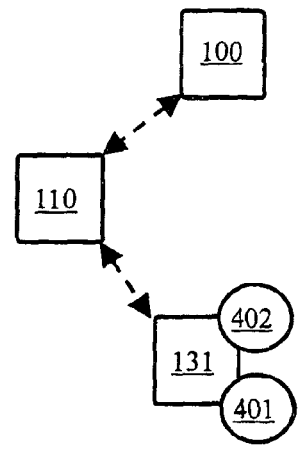
Fig. 4E          Fig. 4F          Fig. 4G

METHOD, PROCESSING DEVICE AND INFORMATION STORAGE MEANS FOR ALLOCATING RESOURCES FOR A DOWNLINK COMMUNICATION ON A FREQUENCY SELECTIVE CHANNEL

The present invention generally relates to allocating resource for a downlink communication on a frequency selective channel from an access point of a wireless telecommunications network to a communication device located in a moving conveyance moving on a path.

In wireless communications, resources are usually defined as parameters of a multiple access transmission technology that allows several devices to transmit on a same frequency channel in a same time frame, where the time domain is sequentially divided into time frames. For example, in TDMA (Time Division Multiple Access), the resources are periods of time in a time frame; in FDMA (Frequency Division Multiple Access), the resources are sub-parts of the frequency spectrum used for communication over the whole time frame; and, in CDMA (Code Division Multiple Access), the resources are spreading codes used during the whole time frame. Also, several multiple access technologies can be used at the same time. An interference received at a given receiver device is defined as the signal transmitted by one or several source devices to one or several other receiver devices on same resources as the ones used by a source device for transmitting data to said given receiver device.

In a wireless telecommunications system, access points (APs) are deployed along a path over which a moving conveyance moves in order to offer wireless communications services to communication devices located in the moving conveyance. For instance, the moving conveyance is a train and the path is a railroad. The APs can be connected to a server implemented in a core network or be directly connected one with each other in order to respectively implement centralized or decentralized radio resources management and/or mobility management functionalities. When the moving conveyance moves along the path, the considered communication devices located in the moving conveyance are assumed to communicate with the AP providing the most robust data link through hand-over procedures. Such communications with the APs use resources typically allocated by the APs or the aforementioned server. Usually, such resources correspond to a channel in the ISM (Industrial, Scientific and Medical) radio band, which implies that other neighbouring devices are also using same resources with a high probability. Therefore, many communications may occur concurrently in unlicensed spectrum.

It is therefore desirable to optimize the resources allocation for downlink communications from APs located along a path of a moving conveyance to at least one communication device located in the moving conveyance, interferers implying interference on said downlink communications.

To that end, the present invention concerns a method for allocating resources for a downlink communication on a frequency selective channel from an access point of a wireless telecommunications network to a communication device located in a moving conveyance performing a journey on a path. The method is such that a processing device performs: obtaining a first interference profile according to a position of the moving conveyance on the path, said first interference profile being representative of interference on said downlink communication implied by at least one interferer located along the path; obtaining a second interference profile, said second interference profile being representative of interference on said downlink communication implied by at least one interferer located in the moving conveyance; and allocating the resources for said downlink communication, on the basis of the first and second interference profiles.

Thus, the resource allocation for the downlink communication can be optimized or at least enhanced.

According to a particular feature, the first interference profile depends at least on interference measurements or estimations performed relatively to at least one communication device located in the moving conveyance or another moving conveyance during at least one preceding journey on said path; and the second interference profile depends at least on interference measurements or estimations performed relatively to at least one communication device located in the moving conveyance during the journey.

Thus, the resource allocation can take benefit of measurements performed by communication devices located in moving conveyances performing journeys on the path.

According to a particular feature, the communication device located in the moving conveyance performs upon receiving interference signals: determining whether the received interference signals correspond to interferers located along said path and/or to interferers located in the moving conveyance; providing information for updating the second interference profile, for received interference signals corresponding to interferers located in the moving conveyance; and providing information for updating a fingerprint map used to define the first interference profile for at least one next journey of the moving conveyance or another moving conveyance on the path, for received interference signals corresponding to interferers located along said path.

Thus, measurements performed during the journey can provide benefit for a communication device located in a moving conveyance performing later on a journey on the path.

According to a particular feature, the communication device located in the moving conveyance, for determining whether the received interference signals correspond to interferers located along said path or to interferers located in the moving conveyance, performs: decoding a header portion of a data packet present in the received interference signal; determining an identifier of a transmitter of the data packet, from the decoded header portion; determining that the received interference signals correspond to interferers located in the moving conveyance when said identifier has been already obtained following interference signals received at another position of the moving conveyance on the path.

Thus, interferers located in the moving conveyance can be identified and a distinction between interference implied by interferers located along the path and interferers located in the moving conveyance can be made.

According to a particular feature, the communication device located in the moving conveyance, for determining whether the received interference signals correspond to interferers located along said path and/or to interferers located in the moving conveyance, performs: obtaining the first interference profile for a current position of the moving conveyance on the path; determining second interference profile data from received signals and from the first interference profile; determining the second interference profile by averaging said determined second interference profile data with other second interference profile data determined for preceding positions of the moving conveyance on the path.

Thus, the second interference profile can be roughly estimated and further refined.

According to a particular feature, the communication device located in the moving conveyance, for determining whether the received interference signals correspond to interferers located along said path and/or to interferers located in the moving conveyance, performs: determining a position of the moving conveyance for which the first interference profile is expected to be negligible; determining the second interference profile from received signals, when said signals are received when the moving conveyance reaches said position.

Thus, the communication device can take benefit of a particular position at which the first interference profile is expected to be negligible for determining the second interference profile. It provides a simple method for determining the second interference profile when the path has, at least for one segment, known properties implying absence of interferers along the path. For instance, the moving conveyance is a train and the considered segments correspond to a tunnel or a field.

According to a particular feature, the second interference profile is determined by averaging an interference measured over at least one segment by the communication device located in the moving conveyance minus an averaged interference measured for said segment by at least one communication device located in the moving conveyance or another moving conveyance not carrying any interferer during at least one preceding journey on said path.

Thus, the first interference profile can be easily determined by using at least one sounding moving conveyance, i.e. a moving conveyance not carrying any interferer.

According to a particular feature, for a given segment of the path, the first interference profile is refined by averaging an interference measured over said segment by the communication device located in the moving conveyance minus an interference implied by at least one interferer carried by the moving conveyance or another moving conveyance during at least one preceding journey on said path.

Thus, once the second interference profile is obtained for at least one moving conveyance, the first interference profile can be refined.

According to a particular feature, the first and second interference profiles are determined by applying a linear filter to an interference measured over at least one segment by the communication device located in the moving conveyance, said linear filter introducing a bias and producing biased estimations of the first and second interference profiles, wherein said bias becomes negligible when summing the first and second interference profiles.

Thus, the processing device is able to obtain estimates of the first and second interference profiles even when measurements are available only for moving conveyances carrying interferers and when the interference from interferers located along the path and interferers located in the moving conveyance are not negligible one with respect to the other. Even though a bias is present, such a bias is cancelled when estimating the interference undergone by the communication device located in the moving conveyance for the resource allocation.

According to a particular feature, the first and second interference profiles are determined by: determining a probability density function of interference measured by the communication device during said journey and by at least one communication device located in the moving conveyance or another moving conveyance during at least one preceding journey on said path; determining the characteristic function of the determined probability density function; applying a logarithm on the determined characteristic function; identifying the logarithms of the characteristic functions of the interference implied by at least one interferer located along the path and of the interference implied by at least one interferer located in the moving conveyance; and the logarithms of said identified characteristic functions respectively correspond to the first and second interference profiles.

Thus, the processing device is able to separate the probability density functions, used for defining the first and second interference profiles, from the superimposed observation of independent random variables of the interference related to the first and second interference profiles.

According to a particular feature, said first interference profile is determined on the basis of a fingerprint map, said fingerprint map storing data related to interference determined consecutively to at least one preceding journey of the moving conveyance or another moving conveyance on said path, as a function of positions of the moving conveyance on said path or of segments of said path.

Thus, data follow-up and collecting for building the first interference profile can easily be performed.

According to a particular feature, said fingerprint map is stored by a server, the server provides a partial fingerprint map to the access point, said partial fingerprint map comprising interference data corresponding at least to an area covered by the access point and the processing device is implemented by the access point.

Thus, such an architecture provides high flexibility and low overhead in the exchanges between the concerned devices.

According to a particular feature, the processing device performs: determining at least one segment of the path through which the moving conveyance is expected to travel during the period during which the resources allocation applies, as a function of the speed of the moving conveyance; and determining values of the first and second interference profiles to be taken into account for allocating said resources for said downlink communication, on the basis of the determined segments.

Thus, the resource allocation is further enhanced by having an interference estimation that more closely matches transmission conditions when the allocated resources are effectively used for the downlink communication.

The present invention also concerns a processing device for allocating resources for a downlink communication on a frequency selective channel from an access point of a wireless telecommunications network to a communication device located in a moving conveyance performing a journey on a path. The processing device comprises: means for obtaining a first interference profile according to a position of the moving conveyance on the path, said first interference profile being representative of interference on said downlink communication implied by at least one interferer located along the path; means for obtaining a second interference profile, said second interference profile being representative of interference on said downlink communication implied by at least one interferer located in the moving conveyance; and means for allocating the resources for said downlink communication, on the basis of the first and second interference profiles.

The present invention also concerns a computer program that can be downloaded from a communication network and/or stored on a medium that can be read by a processing device. This computer program comprises instructions for causing implementation of the aforementioned method, when said program is run by the processor. The present invention also concerns information storage means, storing a computer program comprising a set of instructions causing implementation of the aforementioned method, when the stored information is read from said information storage means and run by a processor.

Since the features and advantages related to the processing device and to the computer program are identical to those already mentioned with regard to the corresponding aforementioned method, they are not repeated here.

Figure 2:
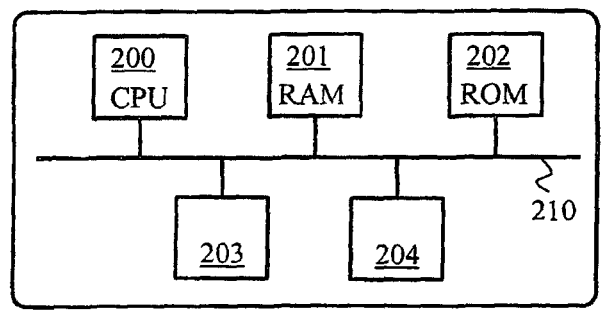
Figure 5:
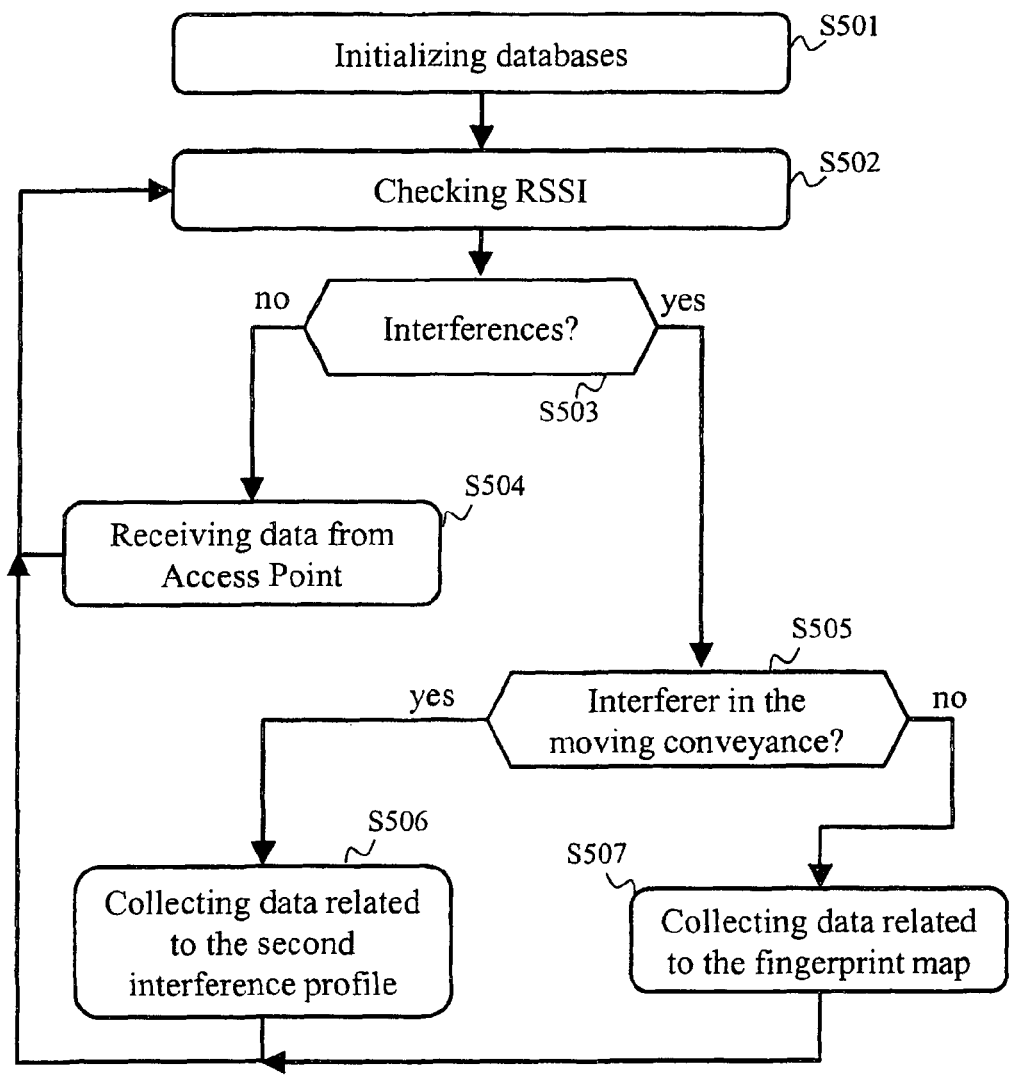
Figure 6:
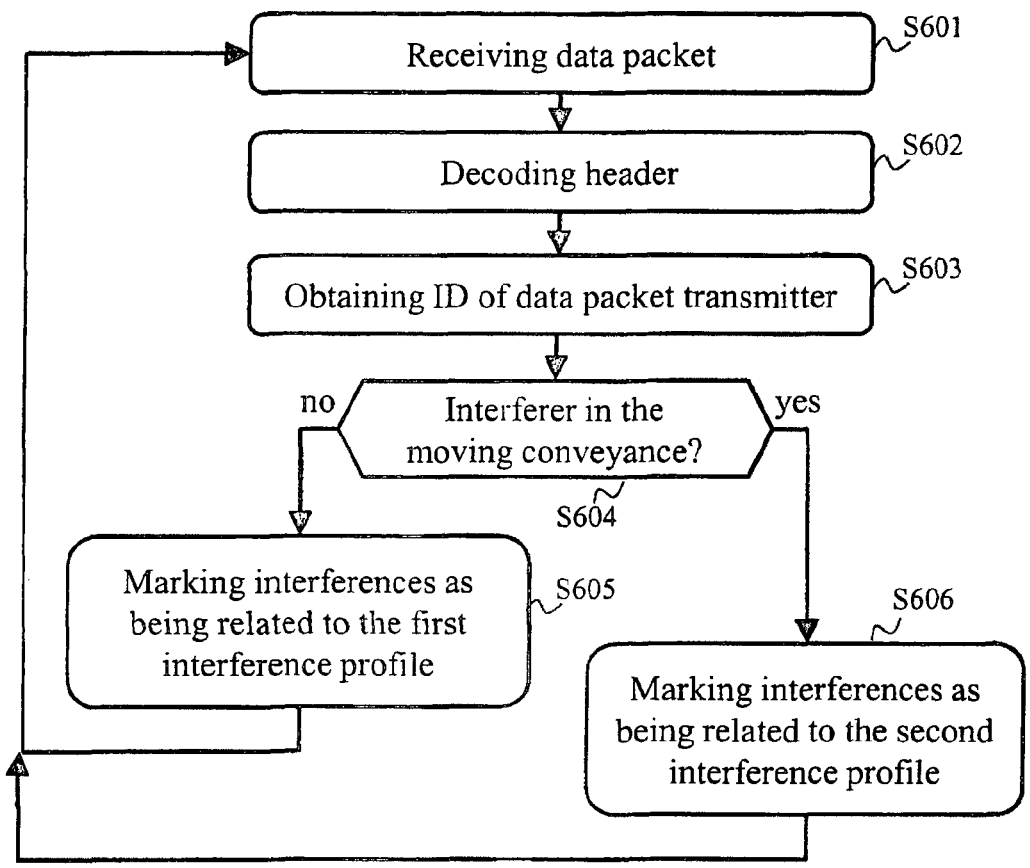
Figure 7:
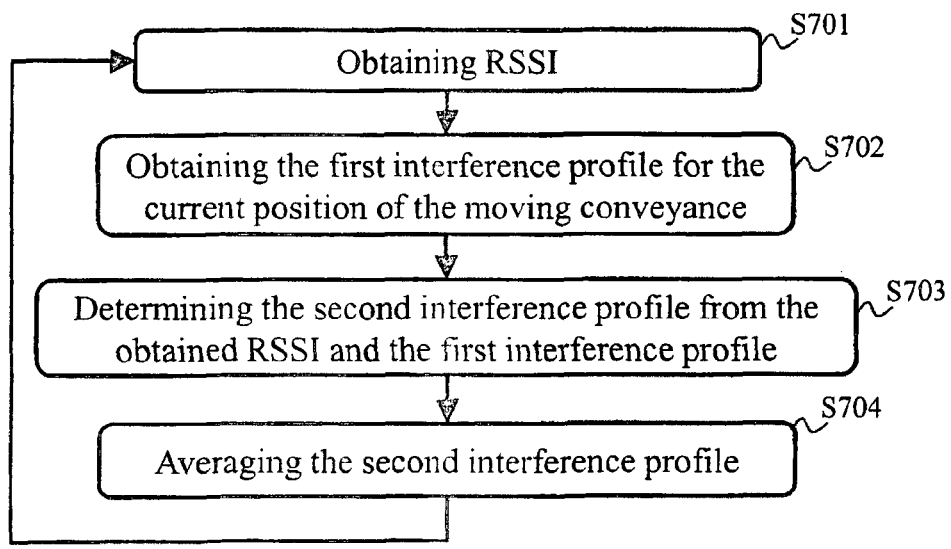

The characteristics of the invention will emerge more clearly from a reading of the following description of an example of embodiment, said description being produced with reference to the accompanying drawings, among which:

FIG. 1 schematically represents a wireless telecommunications system in which the present invention may be implemented;

FIG. 2 schematically represents an architecture of a processing device of the wireless telecommunications system;

FIG. 3 schematically represents an algorithm for determining resources to be allocated for downlink communications from APs of the wireless telecommunications system to a communication device located in a moving conveyance;

FIGS. 4A to 4G schematically represent configurations of the wireless telecommunications system for implementing the present invention;

FIG. 5 schematically represents an algorithm for collecting interference data, implemented by a communication device located in the moving conveyance;

FIG. 6 schematically represents a first algorithm implemented by a communication device in the moving conveyance for differentiating interference involved by static interferers along a path of the moving conveyance and interference involved by interferers located in the moving conveyance;

FIG. 7 schematically represents a second algorithm implemented by a communication device in the moving conveyance for differentiating interference involved by static interferers along a path of the moving conveyance and interference involved by interferers located in the moving conveyance.

FIG. 1 schematically represents a wireless telecommunications system in which the present invention may be implemented.

The wireless telecommunications system comprises APs 110, 111 located along a path 170 of a moving conveyance 130. The moving conveyance 130 is for instance a train and the path is the railroad guiding the train from a departure station to an arrival station. According to another example, the moving conveyance 130 is a bus and the path is a predefined route followed by the bus.

The APs 110, 111 offer services of the wireless telecommunications system to communication devices, such as the communication device 131 located in the moving conveyance 130. The communication device 131 is for instance a mobile terminal or a relay station allowing mobile terminals located in the moving conveyance to access the services of the wireless telecommunications system via the APs.

The wireless telecommunications system may further comprise a server 100, for instance implemented in a core network implementing centralized radio resources management and/or mobility management functionalities.

The APs 110, 111 may be interconnected one with each other, thus implementing decentralized radio resources management and/or mobility management functionalities.

Static interferers 150, 151, 152, 153 may be located sufficiently close to the path 170 of the moving conveyance 130 to impact the downlink communications from the APs 110, 111 to the communication device 131 located in the moving conveyance 130. Such interferers 150, 151, 152, 153 are for instance WiFi (registered trademark) access points, conforming to the IEEE 802.11 standards.

Other static interferers 140, 141 may be located sufficiently close to the AP 110 to impact the uplink communications from the communication device 131 located in the moving conveyance to the AP 110. Such interferers 140, 141 are for instance WiFi (registered trademark) access points, conforming to the IEEE 802.11 standards.

Further interferers 160, 161, 162 may be located inside the moving conveyance 130 and therefore move with it. These interferers 160, 161, 162 impact the downlink and uplink communications from the APs, 110, 111 to the communication device 131 located in the moving conveyance 130. Such interferers are for instance Bluetooth (registered trademark) devices, conforming to the IEEE 802.15.1 standards, or Zigbee (registered trademark) devices, conforming to the IEEE 802.15.4 standards.

As the aforementioned interferers imply different kind of interference on the downlink communications from the APs to the communication device 131 located in the moving conveyance 130, according to their static or non-static geolocation nature, interference management should be addressed by taking into account this difference of nature. This aspect is detailed hereafter with regard to FIGS. 3 to 7.

A processing device is in charge of determining the appropriate resources allocation for the downlink communications from the APs 110, 111 to the communication device 131 in the moving conveyance 130. The processing device may further be in charge of determining the appropriate resources allocation for the uplink communications from the communication device 131 in the moving conveyance 130 to the APs 110, 111.

As will be detailed hereafter with regard to FIG. 4A to 4G, the processing device can be located in, or connected to, the server 100, the APs 110, 111, or the communication device 131.

FIG. 2 schematically represents an architecture of the processing device. According to the shown architecture, the processing device comprises the following components interconnected by a communications bus 210: a processor, microprocessor, microcontroller or CPU (Central Processing Unit) 200; a RAM (Random-Access Memory) 201; a ROM (Read-Only Memory) 202; an HDD (Hard-Disk Drive) or an SD (Secure Digital) card reader 203, or any other device adapted to read information stored on storage means; a communication interface 204.

The communication interface 204 allows the processing device to communicate with the communication device 131 located in the moving conveyance 130 and/or with the APs 110, 111 and/or with the server 100.

CPU 200 is capable of executing instructions loaded into RAM 201 from ROM 202 or from an external memory, such as an SD card or the HDD. After the processing device has been powered on, CPU 200 is capable of reading instructions from RAM 201 and executing these instructions. The instructions form one computer program that causes CPU 200 to perform some or all of the steps of the algorithms described hereafter with regard to FIGS. 3, 5 and 6.

Any and all steps of the algorithms described hereafter with regard to FIGS. 3, 5 and 6, may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

FIG. 3 schematically represents an algorithm for determining resources to be allocated for downlink communications from at least one of the APs 110, 111 to the communication device 131 located in the moving conveyance 130. The algorithm of FIG. 3 is performed by the processing device.

In a step S301, the processing device obtains a position of the moving conveyance 130 along the path 170. The position may be expressed as an absolute value in a geographical coordinate system, or as a relative value with respect to fixed reference points, such as with respect to the respective positions of the APs 110, 111.

According to a first example, the position is obtained from GPS (Global Positioning System) information provided by the a GPS receiver associated with the communication device 131 and transmitted by the communication device 131 toward the processing device.

According to a second example, the position is obtained from received signal power information determined by the communication device 131 from signals received from the APs 110, 111. Knowing the position of the APs 110, 111, and knowing the path 170 followed by the moving conveyance 130, allows determining the position of the communication device 131 from measurements of power of the signals received by the communication device 131 from the APs 110, 111. Each received signal power information is transmitted by the communication device 131 toward the processing device.

According to a third example, the position is obtained from received signal power information determined by the APs 110, 111, from signals received from the communication device 131. Knowing the position of the APs 110, 111, and knowing the path 170 followed by the moving conveyance 130, allows determining the position of the communication device 131 from measurements of power of the signals received by the APs 110, 111 from the communication device 131. The received signal power information is transmitted by the APs 110, 111 toward the processing device.

According to a fourth example, the position is obtained thanks to sensors placed along the path of the moving conveyance and adapted to detect the moving conveyance goes through. Notifications of such detection are transmitted by the sensors toward the processing device.

Moreover, a position may correspond to a segment of the path 170. Plural effective consecutive positions on the path 170 may then be associated with a single position for the purpose of the invention.

In a following step S302, the processing device obtains a first interference profile related to the static interferers 150, 151, 152, 153 located along the path 170 of the moving conveyance 130. The first interference profile depends on the position of the moving conveyance 130 on the path 170. Indeed, as the interferers 150, 151, 152, 153 are static, their possible impact on the downlink communications from the APs 110, 111 to the communication device 131 located in the moving conveyance 130 evolve with the position of the moving conveyance 130.

An interference profile is data that allows characterizing the interference, as perceived by the communication device 131. For example, the interference profile is an interference level received on resources and averaged over several time frames, or a power distribution on resources, or a resources usage distribution defined as the probability to observe an interference in the next time frames knowing a current interference status.

The interference profile can be obtained from measurements available at the communication device 131. For example, the measurements are the received signal power on a given resource and averaged over time, or the averaged frame error rate from which a signal-to-interference-plus-noise ratio (SINR) can be deduced, hence an interference level. Also, if the previous information cannot be given to the processing device, one can rely on statistics of acknowledgement signals when ACK/NACK mechanisms are implemented in the communication protocol.

In a preferred embodiment, the processing device determines the first interference profile from a fingerprint map of interference stored in a database, the fingerprint map of interference providing expected interference levels and is built from the interference observed during preceding journeys of the moving conveyance 130 on the path 170 as a function of a position on the path 170 or of a segment of the path 170. As will be detailed hereafter with regard to FIG. 4A to 4G, the database storing the fingerprint map of interference can be located in, or connected to, the server 100, the APs 110, 111, or the communication device 131. The database storing the fingerprint map of interference can be implemented in a different location than the processing device, the device in which the database is implemented hence providing the contents of the database to the processing device.

In a following step S303, the processing device obtains a second interference profile related to the interferers 160, 161, 162 located inside the moving conveyance 130.

In a following step S304, the processing device allocates resources for the downlink communications from at least one AP 110, 111 to the communication device 131 located inside the moving conveyance 130, at least on the basis of the first and second interference profiles. For example, the resources allocation is made so as to maximize an expected SINR for a communication occurring at a given position. The expected SINR is computed from the information obtained from the fingerprint map of interference and the second interference profile. More precisely, the processing device obtains the signal power as expected to be received from the at least one AP 110, 111, at the given position, the expected level of interference from the static interferers 150, 151, 152, 153 and the interferers 160, 161, 162, and the noise factor at the communication device 131, and computes the resulting SINR.

As detailed hereinafter, in at least one embodiment, the first interference profile depends at least on interference measurements or estimations performed relatively to at least one communication device located in the moving conveyance or another moving conveyance during at least one preceding journey on said path, and the second interference profile depends at least on interference measurements or estimations performed relatively to at least one communication device located in the moving conveyance during the current journey on the path.

When the same resources allocation must be used in downlink and uplink, the processing device further takes into account a third interference profile related to the static interferers 140, 141. The third interference profile is computed by the at least one AP 110, 111 for uplink communications, with the techniques already described with regard to the step S303.

FIGS. 4A to 4G schematically represent configurations of the wireless telecommunications system for implementing the present invention. FIGS. 4A to 4G show the server 100, the communication device 131 located in the moving conveyance 130, as well as the AP 110. The configuration is duplicated for the other APs of the wireless telecommunications system.

FIG. 4A schematically represents a first configuration. In this configuration, the processing device 402 is located in, or connected to, the server 100. The fingerprint map 401 of interference is also located in, or connected to, the server 100. In this configuration, the server 100 receives, via the AP 110, from the communication device 131 located in the moving conveyance 130 any data for updating the fingerprint map 401 of interference and any data related to the second interference profile.

In case the third interference profile is used by the processing device 402 for allocating resources, any data related to the third interference profile is provided by the AP 110 to the server 100.

FIG. 4B schematically represents a second configuration. In this configuration, the processing device 402 is located in, or connected to, the communication device 131 located in the moving conveyance 130. The fingerprint map 401 of interference is located in, or connected to, the server 100. In this configuration, the server 100 receives, via the AP 110, from the communication device 131 located in the moving conveyance 130 any data for updating the fingerprint map 401. The communication device 131 located in the moving conveyance 130 receives, via the AP 110, from the server 100 any data related to the first interference profile.

Alternatively, the update of the fingerprint map 401 of interference may be performed via data storage portable means, such as a USB (Universal Serial Bus) flash drive, that is firstly plugged to the communication device 131 for transferring to the USB flash drive data stored in the database during the journey of the moving conveyance on the path 170, and that is secondly plugged to the server 100 for transferring to the server 100 the data stored by the USB flash drive.

In case the third interference profile is used by the processing device 402 for allocating resources, any data related to the third interference profile is provided by the AP 110 to the communication device 131 located in the moving conveyance 130.

FIG. 4C schematically represents a third configuration. In this configuration, the processing device 402 is located in, or connected to, the AP 110. The fingerprint map 401 of interference is also located in, or connected to, the AP 110. In this configuration, the AP 110 receives from the communication device 131 located in the moving conveyance 130 any data for updating the fingerprint map 401 and any data related to the second interference profile.

FIG. 4D schematically represents a fourth configuration. In this configuration, the processing device 402 is located in, or connected to, the AP 110. The fingerprint map 401 of interference is located in, or connected to, the server 100. A partial fingerprint map 403 of interference is located in, or connected to, the AP 110. This partial fingerprint map 403 of interference corresponds to a portion of the fingerprint map 401 for the part of the path 170 that is in the area managed by the AP 110. In this configuration, the server 100 receives, via the AP 110, from the communication device 131 located in the moving conveyance 130 any data for updating the fingerprint map 401. The AP 110 receives from the communication device 131 located in the moving conveyance 130 any data related to the second interference profile. The AP 110 receives from the server 100 any data for updating the partial fingerprint map 403 of interference.

FIG. 4E schematically represents a fifth configuration. In this configuration, the processing device 402 is located in, or connected to, the communication device 131 located in the moving conveyance 130. The fingerprint map 401 of interference is located in, or connected to, the AP 110. In this configuration, the AP 110 receives from the communication device 131 located in the moving conveyance 130 any data for updating the fingerprint map 401. The communication device 131 located in the moving conveyance 130 receives from the AP 110 any data related to the first interference profile.

In case the third interference profile is used by the processing device 402 for allocating resources, any data related to the third interference profile is provided by the AP 110 to the communication device 131 located in the moving conveyance 130.

FIG. 4F schematically represents a sixth configuration. In this configuration, the processing device 402 is located in, or connected to, the communication device 131 located in the moving conveyance 130. The fingerprint map 401 of interference is located in, or connected to, the server 100. The partial fingerprint map 403 of interference is located in, or connected to, the AP 110. In this configuration, the server 100 receives, via the AP 110, from the communication device 131 located in the moving conveyance 130 any data for updating the fingerprint map 401. The AP 110 receives from the server 100 any data for updating the partial fingerprint map 403 of interference. The communication device 131 located in the moving conveyance 130 receives from the AP 110 any data related to the first interference profile.

Alternatively, the update of the fingerprint map 401 of interference may be performed via data storage portable means, such as a USB flash drive, that is firstly plugged to the communication device 131 for transferring to the USB flash drive data stored in the database during the journey of the moving conveyance on the path 170, and that is secondly plugged to the server 100 for transferring to the server 100 the data stored by the USB flash drive.

In case the third interference profile is used by the processing device 402 for allocating resources, any data related to the third interference profile is provided by the AP 110 to the communication device 131 located in the moving conveyance 130.

FIG. 4G schematically represents a seventh configuration. In this configuration, the processing device 402 is located in, or connected to, the communication device 131 located in the moving conveyance 130. The fingerprint map 401 of interference is also located in, or connected to, the communication device 131 located in the moving conveyance 130.

In case the third interference profile is used by the processing device 402 for allocating resources, any data related to the third interference profile is provided by the AP 110 to the communication device 131 located in the moving conveyance 130.

In a preferred embodiment, the configuration shown in FIG. 4D is implemented.

FIG. 5 schematically represents an algorithm for collecting interference data, implemented by the communication device 131 located in the moving conveyance 130.

In a step S501, the communication device 131 initializes databases aiming at storing interference data collected by the communication device 131 respectively related to the fingerprint map 401 of interference and to the second interference profile.

In a following step S502, in order to determine whether signals are received on resources, the communication device 131 checks if the received signal power is above a given threshold, or performs a detection of pre-determined signals like synchronization sequences, for example with auto- or inter-correlation detection techniques, etc.

The communication device 131 may also listen to other frequencies when the AP 110 is in idle mode, i.e. not transmitting signals. According to a first example, the communication device 131 listens to other frequencies for a predefined period on demand of the AP 110, in order to perform sounding of interference implied by the static interferers 150, 151, 152, 153 located along the path 170. According to a second example, the communication device 131 does the same on its own. It however requires that the communication device 131 obtains timing information about the scheduling of communications with the AP 110, in order to guarantee that listening of such other frequencies is effectively performed when the AP 110 is in idle mode.

When signals are received, the communication device 131 determines in a following step S503 whether the received signal corresponds to interference or to signals received from the AP 110. The communication device 131 determines that the signals are received from the AP 110 when, after decoding of the signals, a header indicates that the AP 110 has performed the transmission.

When the signals are received from the AP 110 and when the signals are intended to be processed by the communication device 131, the communication device 131 performs a step S504. The communication device 131 determines that the signals are intended to be processed by the communication device 131 when, after decoding of the signals, a header indicates that the signals are addressed to the communication device 131.

In the step S504, the communication device 131 processes the signals received from the AP 110.

When the signals are received from the AP 110 and when the signals are intended to be processed by the communication device 131, the communication device 131 repeats the step S502.

When the signals are determined to be interference, the communication device 131 performs a step S505, in which the communication device 131 determines whether the signals are received from an interferer located in the moving conveyance 130 or from a static interferer located along the path 170 of the moving conveyance 130. Determining whether the signals are received from an interferer located in the moving conveyance 130 or from a static interferer located along the path 170 is detailed hereafter with regard to FIG. 6.

When the signals are received from an interferer located in the moving conveyance 130, the communication device 131 performs a step S506; otherwise, the communication device 131 performs a step S507.

In the step S506, the communication device 131 collects data related to the second interference profile. In other words, the communication device 131 updates the database initialised in the step S501 and related to the second interference profile, on the basis of the signals received in the step S502. The communication device 131 then provides the contents of said database to the processing device. Then the communication device 131 repeats the step S502.

In the step S507, the communication device 131 collects data related to the fingerprint map 403 of interference. The communication device 131 updates the local database initialised in the step S501 and used to store data related to the fingerprint map 401 of interference. In other words, the communication device 131 updates said local database on the basis of the signals received in the step S502 and of an information representative of the position of the moving conveyance 130 on the path 170. The fingerprint map 401 of interference is later on updated on the basis of data stored in said local database along at least a portion of the path 170 by the communication device 131. This update of the fingerprint map 401 of interference may be performed via an uplink transmission from the communication device 131 to the server 100 via the AP 110, or via an uplink transmission from the communication device 131 to the server 100 via the AP 110, according to what device implements the fingerprint map 401 of interference. Alternatively, the update of the fingerprint map 401 of interference may be performed via data storage portable means, such as a USB flash drive, that is firstly plugged to the communication device 131 for transferring to the USB flash drive data stored in the database during the journey of the moving conveyance on the path 170, and that is secondly plugged to the server 100 for transferring to the server 100 the data stored by the USB flash drive. Wired or wireless communication link can also be used to perform such a data transfer at the end of the journey of the moving conveyance on the path 170. Then the communication device 131 repeats the step S502.

When a superimposition of a signal transmitted by the AP 110 and a signal transmitted by at least one interferer is received and checked in the step S502, whereas the communication device 131 has beforehand received signals from the AP 110 and has consequently performed the step S504, the communication device 131 is then able to remove the contribution of said signal received beforehand from the received superimposed signal and then perform the steps S505, S506 and S507.

FIG. 6 schematically represents a first algorithm implemented by the communication device 131 in the moving conveyance 130 for differentiating interference involved by static interferers 150, 151, 152, 153 along the path 170 of the moving conveyance 130 and interference involved by interferers 160, 161, 162 located in the moving conveyance 130.

In a step S601, the communication device 131 receives signals representative of a data packet.

In a following step S602, the communication device 131 decodes a header portion of the received data packet. It implies that the communication device 131 has a MAC and PHY (physical) interface that is compliant with the MAC and PHY interface of the interferers.

In a following step S603, the communication device 131 obtains from the decoded header portion an identifier of the data packet transmitter.

In a following step S604, the communication device 131 determines whether the obtained identifier has already been obtained by decoding of a header portion during a preceding section of the path 170 which is located further than the typical transmission range of static interferer located along the path 170. If so, it means that the transmitter of the received data packet was already an interferer during the journey of the moving conveyance 130, and thus that this interferer is not a static interferer located along the path 170 but is an interferer located inside the moving conveyance 130. In this case, a step S606 is performed; otherwise a step S605 is performed.

In a following step S605, the communication device 131 marks the interference implied by the receiving of said data packet as being related to the first interference profile. Then, the step S601 is repeated.

In the step S606, the communication device 131 marks the interference implied by the receiving of said data packet as being related to the second interference profile. Then, the step S601 is repeated.

FIG. 7 schematically represents a second algorithm implemented by the communication device 131 in the moving conveyance 130 for differentiating interference involved by static interferers 150, 151, 152, 153 along the path 170 of the moving conveyance 130 and interference involved by interferers 160, 161, 162 located in the moving conveyance 130.

As mentioned, the algorithm of FIG. 6 implies that the communication device 131 has a MAC and PHY interface that is compliant with the MAC and PHY interface of the interferers. However, the unlicensed spectrum is typically shared by a high heterogeneity of communication standards, which requires that the communication device 131 be capable of decoding the packets from many standards. It would be advantageous getting rid of this constraint in at least one embodiment of the present invention. An approach is to define statistics of the interference implied by the interferers faced by the downlink communications from the APs 110, 111 to the communication device 131.

At a given instant, on a given communication channel, the communication device 131 observes the superimposition of the interference implied by the static interferers 150, 151, 152, 153 located along the path 170 and by the interferers 160, 161, 162 located inside the moving conveyance 130.

It is assumed that a fingerprinting of the interference implied by the static interferers 150, 151, 152, 153 located along the path 170 is already available. For example by obtaining a first batch of interference measurements using at least one moving conveyance that does not carry any interferer. When such a fingerprinting of the interference implied by the static interferers 150, 151, 152, 153 located along the path 170 is already available, the second interference profile can be obtained by subtracting the expected interference implied by the static interferers.

Accordingly, in a step S701, the communication device 131 obtains received signal power information, as already described with regard to the step S502.

In a following step S702, the communication device 131 obtains the first interference profile for the current position of the moving conveyance 130 on the path 170, for example by obtaining a first batch of interference measurements using a moving conveyance that does not carry any interferer.

In a following step S703, the communication device 131 determines the second interference profile data from the received signal power information obtained in the step S701 and from the first interference profile, for the current position of the moving conveyance 130 on the path 170, obtained in the step S702. The communication device 131 subtracts the first interference profile from the obtained received signal power information. The communication device 131 therefore obtains an instantaneous estimation of the second interference profile, related to the interferers 160, 161, 162 located in the moving conveyance 130.

In a following step S704, the communication device 131 averages the second interference profile data obtained in the step S703 with other second interference profile data obtained for preceding positions of the moving conveyance 130 on the path 170. The step S701 is then repeated for a following position of the moving conveyance 130 on the path 170. After several averaging over time, the second interference level profile should be stabilizing and be representative of the interference effectively implied by the interferers 160, 161, 162 located in the moving conveyance 130.

In other words, the second interference profile may be obtained by averaging the total interference measured by the communication device 131 over all the path segments minus the averaged interference profile measured by at least one communication device located in at least one respective moving conveyance 130 that did not carry any interferer and that travelled along the path. This might be expressed by the following formula:

$$E_k = \frac{1}{N} \sum_{j=1}^{N} \left( X_{kj} - \frac{1}{K} \sum_{i=M-K+1}^{M} X_{ij} \right)$$

wherein:
$E_k$ is the second interference profile for a considered moving conveyance k;
N is the quantity of segments composing the path;
M is the quantity of moving conveyances having travelled or travelling along the path;
K is the quantity of moving conveyances having travelled along the path without carrying any interferers;
$X_{ab}$ is the observation made by the communication device 131 located in the moving conveyance a during a segment b of the path.

It is moreover assumed that the indexes of the K moving conveyances having travelled along the path without carrying any interferers are from M-K-1 to M.

According to a particular embodiment, the first interference profile may be refined thanks to the second interference profile obtained according to the formula above. The processing device receives from the communication device 131, for each segment of the path 170, the difference between the received signal power and the estimated second interference profile data obtained as a result of the operations described with regard to the formula above. The processing device then performs, for each position, an averaging of the observations made for all moving conveyances minus the second interference profile and updates the first interference profile accordingly. This might be expressed by the following formula:

$$R_k = \frac{1}{M} \sum_{i=1}^{M} (X_{ik} - E_k)$$

wherein:
$R_k$ is the first interference profile related to a segment k.

According to another embodiment, the second interference profile is determined when the expected interference level related to the first interference profile is negligible, or expected to be negligible, compared to the power of the received signal. In other words, the communication device 131 waits for a situation where the moving conveyance 130 is at a position on the path 170 for which no static interferers are present. The interference implied by the received signal is hence assumed to be implied by the interferers 160, 161, 162 located in the moving conveyance 130.

According to yet another embodiment, the second interference profile is assumed to be known with a good robustness as a result of the processing performed for example by the embodiments previously described. The same principles, as mentioned hereinbefore when assuming the first interference profile be known, are applied by inverting the roles of the first and second interference profiles.

According to yet another embodiment, the average interference level of the first and second interference profiles are estimated in a centralized fashion, for instance as shown in FIG. 4A, i.e., all received signal powers are provided to the processing device, or equivalently averaged interference levels on a given part of the path 170 corresponding to a fingerprint value. Then the processing device filters all data in order to estimate all first and second interference profiles for all moving conveyances and segments of the path.

Reusing the definitions already introduced for the formulas above, the observation made by the communication device 131 located in a moving conveyance i over a segment j of the path is the sum of the interference implied by the static interferers 150, 151, 152, 153 located along the path 170 and by the interferers 160, 161, 162 located in the moving conveyance, i.e., the set of N×M observations is expressed as follows:

$$X_{ij} = R_j + E_i$$

Considering an observation vector $X=[X_{11} \ldots X_{1N} X_{21} \ldots X_{2N} \ldots X_{M1} \ldots X_{MN}]$, a vector of variables to be determined $V=[R_1 \ldots R_N E_1 \ldots E_M]^T$, it leads to the following linear system, in which A is an N·M×N+M matrix:

$$X = AV$$

$$A = \begin{bmatrix} I_N & 1_{N \times 1} & 0_{N \times M-1} \\ \vdots & \vdots & \vdots \\ I_N & 0_{N \times M-1} & 1_{N \times 1} \end{bmatrix}$$

where $I_N$ is an N×N identity matrix and $1_{N \times M}$ is an N×M matrix filled with ones.

A condition to solve such a linear system is to get a sufficient number of measurements, which means that the following condition shall be met:

$$N \cdot M \geq N + M$$

The vector $e=[1_{1 \times N} -1_{1 \times M}]^T/\sqrt{N+M}$ is an eigenvector of a null eigenvalue, which involves at least a rank deficiency order of one. There is no pseudo-inverse for $A^T A$, but $A^T A + ee^T$ is invertible.

By filtering the observations by $(A^T A + ee^T)^{-1} A^T$, a biased version Y of the variables V can be obtained as follows:

$$Y = (A^T A + ee^T)^{-1} A^T X = V + ee^T V$$

wherein $Y = [YR_1 \ldots YR_N YE_1 \ldots YE_M]^T$, and $$YR_k = R_k + \frac{1}{M+N}\left(\sum R_j - \sum E_i\right)$$

$$YE_k = E_k + \frac{1}{M+N}\left(\sum E_i - \sum R_j\right)$$

Thus, there is a bias on the estimation of the values $R_k$ and $E_k$, which is due to the aforementioned rank deficiency. Thus, the values $YR_k$ and $YE_k$ are estimated and averaged over time into values $AYR_k$ and $AYE_k$; associated respectively to the first and second interference profiles. The final interference profile $X_{ij}$ is estimated for each one of the M moving conveyances and each one of the N segments of the path by summing the values $AYR_j$ and $AYE_i$, which tends to eliminate the bias pointed out hereinabove. In other words, the first and second interference profiles are determined by applying a linear filter introducing a bias and producing biased estimations of the first and second interference profiles, wherein said bias becomes negligible when summing the first and second interference profiles.

According to yet another embodiment, more advanced stochastic estimation theory is used in order to separate the random distributions. Trying to estimate the disjoint probability density function of the aforementioned random variables R and E from the joint aforementioned observation X, since the random variables R and E are independent, the following formula applies:

$$LX_{ij}(w) = LR_j(w) + LE_i(w)$$

wherein $LX_{ij}(w)$, $LR_j(w)$ and $LE_i(w)$ are the logarithm of the characteristic functions of $X_{ij}$, $R_j$ and $E_i$, or equivalently the logarithm of the Fourier transform of the probability density function of X, R and E, and wherein w represents the argument of the characteristic function.

It can be noticed that using the logarithm of the characteristic functions allows dealing with a sum, as shown in the formula here above, instead of dealing with a convolution of the probability density functions.

The characteristic function computation is for instance implemented with Fourier and inverse Fourier transforms, or in a discrete fashion when the probability density functions are estimated in a discrete fashion and when w takes discrete values, with a Discrete Fourier Transform (DFT) or a Fast Fourier Transform (FFT).

Thus, for a given argument w, the identification of the characteristic functions values LRj(w) and LEi(w) can be obtained as described in the previous embodiments for the identification of the interference implied by the static interferers 150, 151, 152, 153 located along the path 170 and by the interferers 160, 161, 162 located in the moving conveyance.

In other words, the processing device obtains an evaluation of a probability density function of $X_{ij}$ in each segment of the path for each moving conveyance. The processing device determines the characteristic function of the probability density function of $X_{ij}$ and applies a logarithm on the obtained characteristic function. The processing device then identifies the logarithms of the characteristic functions of the independent variable R, E. The logarithms of the characteristic functions of the independent variable R, E respectively correspond to the first and second interference profiles. In order to evaluate the interference to be undergone by the communication device 131 located in the moving conveyance 130, the processing device applies the inverse operation of the logarithms respectively corresponding to the first and second interference profiles, then applies the inverse operation of their respective characteristic functions in order to obtain a probability density function for each interference profile. The probability density functions are then used for determining which resources should be allocated for the downlink communication.

According to a particular embodiment, the processing device determines the segments of the path through which the moving conveyance is expected to travel during the period during which the resources allocation applies. These segments are determined as a function of the speed of the moving conveyance. The processing device then determines the values of the first and second interference profiles to be taken into account for the resource allocation, on the basis of the determined segments.

According to another aspect, in order to allow the tracking of the interference profile, one can implement an interpolation of the fingerprint map according to the train position, which smoothly changes the interference profile and allows a smooth adaptation of the resources allocation algorithm.

The invention claimed is:

1. A method in which a processing device performs:
   obtaining a first interference profile according to a position of a moving conveyance on a path on which said moving conveyance is performing a journey, said first interference profile being representative of interference on a downlink communication on a frequency selective channel from an access point of a wireless telecommunications network located outside said moving conveyance to a communication device located in said moving conveyance, said first interference profile being representative of interference implied by at least one interferer located along the path, outside the moving conveyance;
   obtaining a second interference profile, said second interference profile being representative of interference on said downlink communication implied by at least one interferer different from the communication device and located in the moving conveyance; and
   allocating resources for said downlink communication, on the basis of the first and second interference profiles.

2. The method according to claim 1, wherein
   the first interference profile depends at least on interference measurements or estimations performed relatively to at least one communication device located in the moving conveyance or another moving conveyance during at least one preceding journey on said path; and
   the second interference profile depends at least on interference measurements or estimations performed relatively to at least one communication device located in the moving conveyance during the journey.

3. The method according to claim 1, wherein the communication device located in the moving conveyance performs upon receiving interference signals:
   determining whether the received interference signals correspond to interferers located along said path and/or to interferers located in the moving conveyance;
   providing information for updating the second interference profile, for received interference signals corresponding to interferers located in the moving conveyance; and
   providing information for updating a fingerprint map used to define the first interference profile for at least one next journey of the moving conveyance or another moving conveyance on the path, for received interference signals corresponding to interferers located along said path.

4. The method according to claim 3, wherein the communication device located in the moving conveyance, for determining whether the received interference signals correspond to interferers located along said path or to interferers located in the moving conveyance, performs:
   decoding a header portion of a data packet present in the received interference signal;
   determining an identifier of a transmitter of the data packet, from the decoded header portion;
   determining that the received interference signals correspond to interferers located in the moving conveyance when said identifier has been already obtained following interference signals received at another position of the moving conveyance on the path.

5. The method according to claim 3, wherein the communication device located in the moving conveyance, for determining whether the received interference signals correspond to interferers located along said path and/or to interferers located in the moving conveyance, performs:
   obtaining the first interference profile for a current position of the moving conveyance on the path;
   determining second interference profile data from received signals and from the first interference profile;
   determining the second interference profile by averaging said determined second interference profile data with other second interference profile data determined for preceding positions of the moving conveyance on the path.

6. The method according to claim 3, wherein the communication device located in the moving conveyance, for determining whether the received interference signals correspond to interferers located along said path and/or to interferers located in the moving conveyance, performs:
   determining a position of the moving conveyance for which the first interference profile is expected to be negligible;
   determining the second interference profile from received signals, when said signals are received when the moving conveyance reaches said position.

7. The method according to claim 1, wherein the second interference profile is determined by averaging an interference measured over at least one segment by the communication device located in the moving conveyance minus an averaged interference measured for said segment by at least one communication device located in the moving conveyance or another moving conveyance not carrying any interferer during at least one preceding journey on said path.

8. The method according to claim 7, wherein for a given segment of the path, the first interference profile is refined by averaging an interference measured over said segment by the communication device located in the moving conveyance minus an interference implied by at least one interferer carried by the moving conveyance or another moving conveyance during at least one preceding journey on said path.

9. The method according to claim 1, wherein the first and second interference profiles are determined by applying a linear filter to an interference measured over at least one segment by the communication device located in the moving conveyance, said linear filter introducing a bias and producing biased estimations of the first and second interference profiles, wherein said bias becomes negligible when summing the first and second interference profiles.

10. The method according to claim 1, wherein the first and second interference profiles are determined by:
    determining a probability density function of interference measured by the communication device during said journey and by at least one communication device located in the moving conveyance or another moving conveyance during at least one preceding journey on said path;
    determining the characteristic function of the determined probability density function;
    applying a logarithm on the determined characteristic function;
    identifying the logarithms of the characteristic functions of the interference implied by at least one interferer located along the path and of the interference implied by at least one interferer located in the moving conveyance;
    and in that the logarithms of said identified characteristic functions respectively correspond to the first and second interference profiles.

11. The method according to claim 1, wherein said first interference profile is determined on the basis of a fingerprint map, said fingerprint map storing data related to interference determined consecutively to at least one preceding journey of the moving conveyance or another moving conveyance on said path, as a function of positions of the moving conveyance on said path or of segments of said path.

12. The method according to claim 11, wherein said fingerprint map is stored by a server, in that the server provides a partial fingerprint map to the access point, said partial fingerprint map comprising interference data corresponding at least to an area covered by the access point and in that the processing device is implemented by the access point.

13. The method according to claim 6, wherein the processing device performs:
    determining at least one segment of the path through which the moving conveyance is expected to travel during the period during which the resources allocation applies, as a function of the speed of the moving conveyance;
    determining values of the first and second interference profiles to be taken into account for allocating said resources for said downlink communication, on the basis of the determined segments.

14. The method according to claim 7, wherein the processing device performs:
    determining at least one segment of the path through which the moving conveyance is expected to travel during the period during which the resources allocation applies, as a function of the speed of the moving conveyance;
    determining values of the first and second interference profiles to be taken into account for allocating said resources for said downlink communication, on the basis of the determined segments.

15. A processing device comprising:
    means for obtaining a first interference profile according to a position of a moving conveyance on a path on which said moving conveyance is performing a journey, said first interference profile being representative of interference on a downlink communication on a frequency selective channel from an access point of a wireless telecommunications network located outside said moving conveyance to a communication device located in said moving conveyance, said first interference profile being representative of interference implied by at least one interferer located along the path, outside the moving conveyance;
    means for obtaining a second interference profile, said second interference profile being representative of interference on said downlink communication implied by at least one interferer different from the communication device and located in the moving conveyance; and
    means for allocating the resources for said downlink communication, on the basis of the first and second interference profiles.

16. Information storage means, storing a computer program comprising program code instructions which can be loaded in a programmable device for implementing the method according to claim 1, when the program code instructions are run by the programmable device.

* * * * *